US011619901B2

(12) United States Patent
Kaigawa

(10) Patent No.: US 11,619,901 B2
(45) Date of Patent: Apr. 4, 2023

(54) IMAGE FORMING APPARATUS TRANSMITTING REQUEST TO CANCEL AGREEMENT FOR ANOTHER IMAGE FORMING APPARATUS

(71) Applicant: BROTHER KOGYO KABUSHIKI KAISHA, Nagoya (JP)

(72) Inventor: Shinsuke Kaigawa, Kitanagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/525,455

(22) Filed: Nov. 12, 2021

(65) Prior Publication Data

US 2022/0171318 A1    Jun. 2, 2022

(30) Foreign Application Priority Data

Nov. 27, 2020    (JP) .............................. JP2020-197596

(51) Int. Cl.
*G03G 21/00* (2006.01)
*G03G 15/00* (2006.01)
(Continued)

(52) U.S. Cl.
CPC ....... *G03G 15/556* (2013.01); *G03G 15/0863* (2013.01); *G03G 15/5091* (2013.01);
(Continued)

(58) Field of Classification Search
CPC ............. G03G 15/0863; G03G 15/556; G03G 15/5079; G03G 15/5083; G03G 15/5091;
(Continued)

(56) References Cited

U.S. PATENT DOCUMENTS 5,752,128 A * 5/1998 Yamashita ............. G03G 21/02
399/80
2002/0159777 A1* 10/2002 Nagata ............... G03G 15/5079
399/24
(Continued)

FOREIGN PATENT DOCUMENTS

JP       2008257081 A   * 10/2008   ......... G03G 15/0863
WO   WO-2020117417 A1  *  6/2020   ......... B41J 2/17546

*Primary Examiner* — Robert B Beatty
(74) *Attorney, Agent, or Firm* — Merchant & Gould P.C.

(57) ABSTRACT

In an image forming apparatus, a consumable is mounted in the main casing. The consumable includes a consumable memory. A controller performs a consumable determination process to determine based on type information stored in a consumable memory whether the consumable mounted in the main casing is a special consumable. The controller performs a transmission process in a case where the consumable determination process determines that the consumable mounted in the main casing is the special consumable. The transmission process transmits via the communication interface a request to an external device which communicates with the image forming apparatus. The request is to cancel an agreement which is concluded for another image forming apparatus as a contract subject. The another image forming apparatus is different from the image forming apparatus.

8 Claims, 9 Drawing Sheets

(51) Int. Cl.
*G03G 21/18* (2006.01)
*G06F 3/12* (2006.01)
*G06Q 10/087* (2023.01)
*G03G 15/08* (2006.01)

(52) U.S. Cl.
CPC ..... *G03G 21/1875* (2013.01); *G03G 21/1892* (2013.01); *G06F 3/1229* (2013.01); *G06Q 10/087* (2013.01); *G03G 2215/0695* (2013.01)

(58) Field of Classification Search
CPC .......... G03G 21/1875; G03G 21/1878; G03G 21/1892; G03G 2215/0695; G03G 2221/1823; B41J 2/17543; B41J 2/17546; G06F 3/1219; G06F 3/1229; G06K 15/407; G06Q 10/087; G06Q 10/06312
USPC .............................. 399/8, 11, 12, 24, 27, 79
See application file for complete search history.

(56) References Cited

U.S. PATENT DOCUMENTS

| | | | | |
|---|---|---|---|---|
| 2003/0223766 | A1* | 12/2003 | Imai | G03G 15/5083 399/8 |
| 2004/0167839 | A1* | 8/2004 | Amemiya | G06Q 30/0231 705/35 |
| 2018/0131831 | A1 | 5/2018 | Tolia et al. | |
| 2020/0064766 | A1* | 2/2020 | Ushinohama | G06F 3/1224 |
| 2021/0302872 | A1* | 9/2021 | Suzuki | B41J 2/17546 |
| 2021/0304337 | A1* | 9/2021 | Shishido | G06F 3/1239 |
| 2022/0035292 | A1* | 2/2022 | Kishimoto | G03G 15/5016 |

\* cited by examiner

FIG. 4

| USER NAME | DEVICE ID | SUBSCRIPTION | PRE-CHANGE |
|---|---|---|---|
| USER A | 00000001 | VALID | — |
| USER B | 00000002 | PRE-START | — |
| USER C | 00000003 | VALID | — |
| USER D | 00000004 | VALID | — |
| USER E | 00000010 | INVALID | — |
| USER E | 00000015 | VALID | — |
| USER E | 00000041 | VALID | 00000098 |
| USER F | 00000192 | VALID | 00000521 |
| USER F | 00000521 | PRE-START | — |
| USER G | 00000786 | INVALID | 00000855 |
| USER G | 00000855 | VALID | — |
| ... | ... | ... | ... |

FIG. 7

AFTER PROCESS S131 IS PERFORMED

| USER NAME | DEVICE ID | SUBSCRIPTION | PRE-CHANGE |
|---|---|---|---|
| USER A | 00000001 | PRE-START | – |
| USER B | 00000012 | VALID | – |
| USER C | 00000025 | VALID | – |
|  | 00000041 | VALID | – |
| ... | ... | ... | ... |

AFTER PROCESS S134 IS PERFORMED

| USER NAME | DEVICE ID | SUBSCRIPTION | PRE-CHANGE |
|---|---|---|---|
| USER A | 00000001 | VAILD | – |
| USER B | 00000012 | VALID | – |
| USER C | 00000025 | VALID | – |
|  | 00000041 | VALID | – |
| ... | ... | ... | ... |

AFTER PROCESS S231 IS PERFORMED

| USER NAME | DEVICE ID | SUBSCRIPTION | PRE-CHANGE |
|---|---|---|---|
| USER A | 00000001 | VAILD | – |
|  | 00000002 | PRE-START | 00000001 |
| USER B | 00000012 | VALID | – |
| USER C | 00000025 | VALID | – |
|  | 00000041 | VALID | – |
| ... | ... | ... | ... |

AFTER PROCESS S235 IS PERFORMED

| USER NAME | DEVICE ID | SUBSCRIPTION | PRE-CHANGE |
|---|---|---|---|
| USER A | 00000001 | INVAILD | – |
|  | 00000002 | PRE-START | 00000001 |
| USER B | 00000012 | VALID | – |
| USER C | 00000025 | VALID | – |
|  | 00000041 | VALID | – |
| ... | ... | ... | ... |

AFTER PROCESS S236 IS PERFORMED

| USER NAME | DEVICE ID | SUBSCRIPTION | PRE-CHANGE |
|---|---|---|---|
| USER A | 00000001 | INVAILD | – |
|  | 00000002 | VALID | 00000001 |
| USER B | 00000012 | VALID | – |
| USER C | 00000025 | VALID | – |
|  | 00000041 | VALID | – |
| ... | ... | ... | ... |

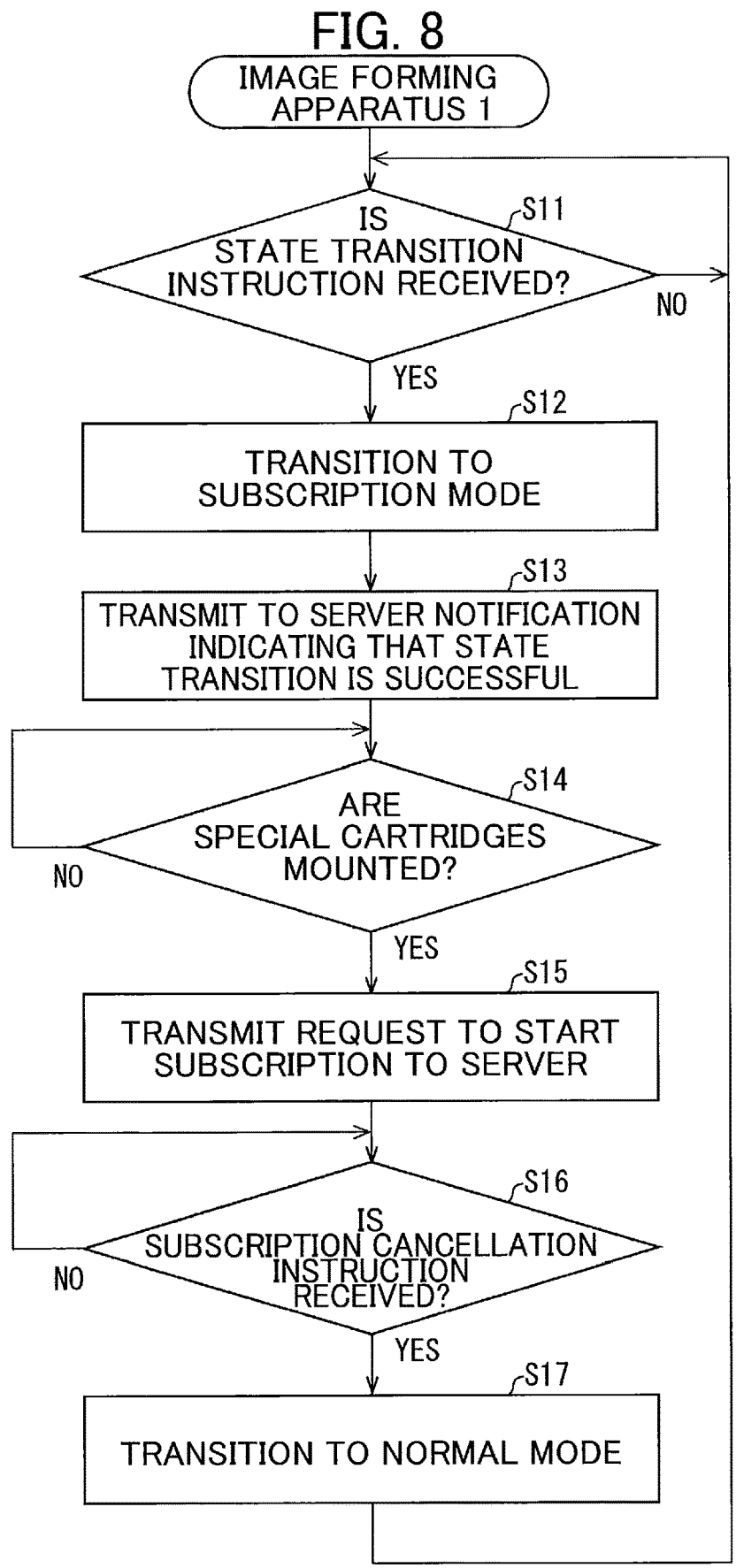

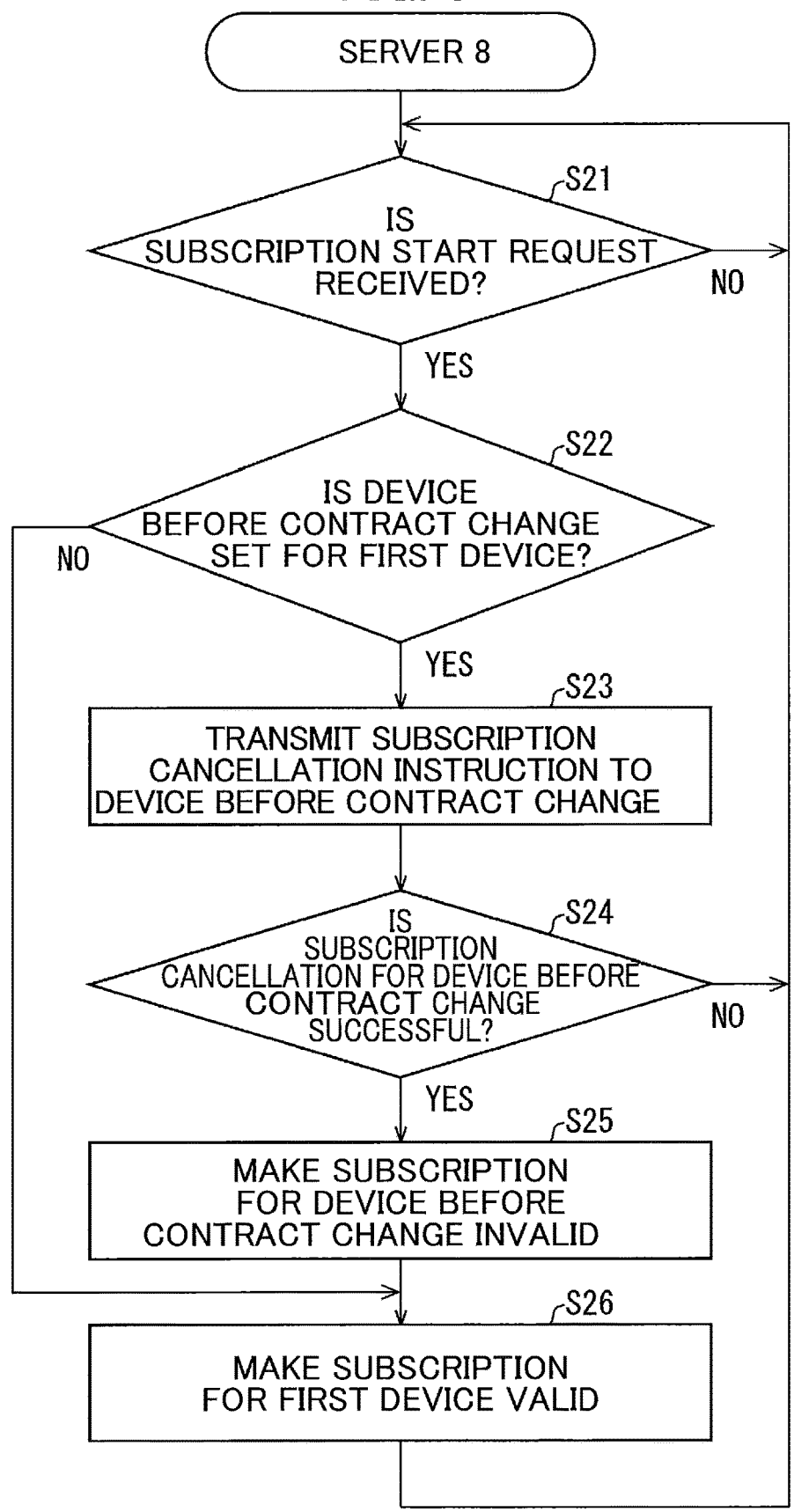

IMAGE FORMING APPARATUS TRANSMITTING REQUEST TO CANCEL AGREEMENT FOR ANOTHER IMAGE FORMING APPARATUS

CROSS REFERENCE TO RELATED APPLICATION

This application claims priority from Japanese Patent Application No. 2020-197596 filed Nov. 27, 2020. The entire content of the priority application is incorporated herein by reference.

BACKGROUND

There are services that allow the use of special consumables specific to subscription or replacements on image forming apparatuses according to an agreement concluded between a user and a company. Such services are called "subscription services." Various technologies are developed to implement subscription services.

In a case where a printer enters a subscription service, for example, one conventional technology sets information in tags on cartridges mounted in the printer to indicate that the cartridges are for use with the subscription service. In a case where the printer is not entered in a subscription service in the technology, tags on the cartridges mounted in the printer are set to indicate that the cartridges are ordinary cartridges. In order to receive a service related to image formation, such as the subscription service described above, the user must enter an agreement with the company that provides the service the user wishes to apply to the image forming apparatus.

SUMMARY

However, in the conventional method of establishing agreements, the procedures performed to cancel an agreement for one image forming apparatus and to conclude an agreement for another image forming apparatus (i.e., to change a subscription from one image forming apparatus to another) required much time and effort.

For example, in the conventional method of establishing agreements, the user had to perform a procedure to cancel an existing agreement for an image forming apparatus for which the existing agreement is already concluded and to perform a procedure to conclude an agreement for an image forming apparatus for which the agreement to be concluded.

In a case where the user forgets to perform the procedure for cancelling the agreement for the image forming apparatus originally concluded in the subscription, this method could result in a condition of duplicate subscriptions, i.e., a condition that both the image forming apparatus before the agreement modification and the image forming apparatus after the agreement modification remain under subscription.

In view of the foregoing problems, it is an object of the present disclosure to simplify the procedure for changing the image forming apparatus for which an agreement is concluded.

In order to attain the above and other objects, the disclosure provides an image forming apparatus. The image forming apparatus includes a main casing, a consumable, a communication interface, and a controller. The consumable is configured to be mounted in the main casing. The consumable includes a consumable memory. The consumable memory stores type information indicating one of that the consumable is a special consumable that can be used in a case where an agreement is concluded for the image forming apparatus as a contract subject and that the consumable is a normal consumable that can be used irrespective of whether the agreement is concluded. The controller is configured to perform: a consumable determination process to determine based on the type information stored in the consumable memory whether the consumable mounted in the main casing is the special consumable; and a transmission process in a case where the consumable determination process determines that the consumable mounted in the main casing is the special consumable, the transmission process being to transmit via the communication interface a request to an external device which communicates with the image forming apparatus, the request being to cancel an agreement which is concluded for another image forming apparatus as a contract subject, the another image forming apparatus being different from the image forming apparatus. Accordingly, the controller can allow another image forming apparatus to cancel the agreement in a case where the consumable mounted in the main casing. Thus, the procedure for changing the image forming apparatus for which an agreement is concluded can be simplified.

According to another aspect, the disclosure provides a method for controlling an image forming apparatus. A consumable memory, which is provided in a consumable mounted in a main casing of the image forming apparatus, stores type information indicating one of that the consumable is a special consumable that can be used in a case where an agreement is concluded for the image forming apparatus as a contract subject and that the consumable is a normal consumable that can be used irrespective of whether the agreement is concluded. The method includes: a consumable determination step to determine based on the type information stored in the consumable memory whether the consumable mounted in the main casing is the special consumable; and a transmission step in a case where the consumable determination step determines that the consumable mounted in the main casing is the special consumable, the transmission step being to transmit via a communication interface in the image forming apparatus a request to an external device which communicates with the image forming apparatus, the request being to cancel an agreement which is concluded for another image forming apparatus as a contract subject, the another image forming apparatus being different from the image forming apparatus.

BRIEF DESCRIPTION OF THE DRAWINGS

The particular features and advantages of the disclosure as well as other objects will become apparent from the following description taken in connection with the accompanying drawings, in which:

FIG. 4 is a diagram illustrating a data structure of a registration table;

FIG. 7 is a diagram illustrating transitions of the registration table according to the operations shown in FIGS. 5 and 6;

FIG. 8 is a flowchart illustrating a flow of processes related to state transitions in the image forming apparatus; and FIG. 9 is a flowchart illustrating a flow of processes related to registration and cancellation of an agreement performed by the server.

DETAILED DESCRIPTION

First Embodiment

Below, an embodiment of the disclosure will be described while referring to FIGS. 1 through 9. In the embodiment, the image forming apparatus is a laser printer, and image formation is execution of printing, for example. However, the image forming apparatus 1 may be a printer other than the laser printer. For example, the image forming apparatus 1 may be an inkjet printer.

Overview of an Image Formation System

Figure 1:
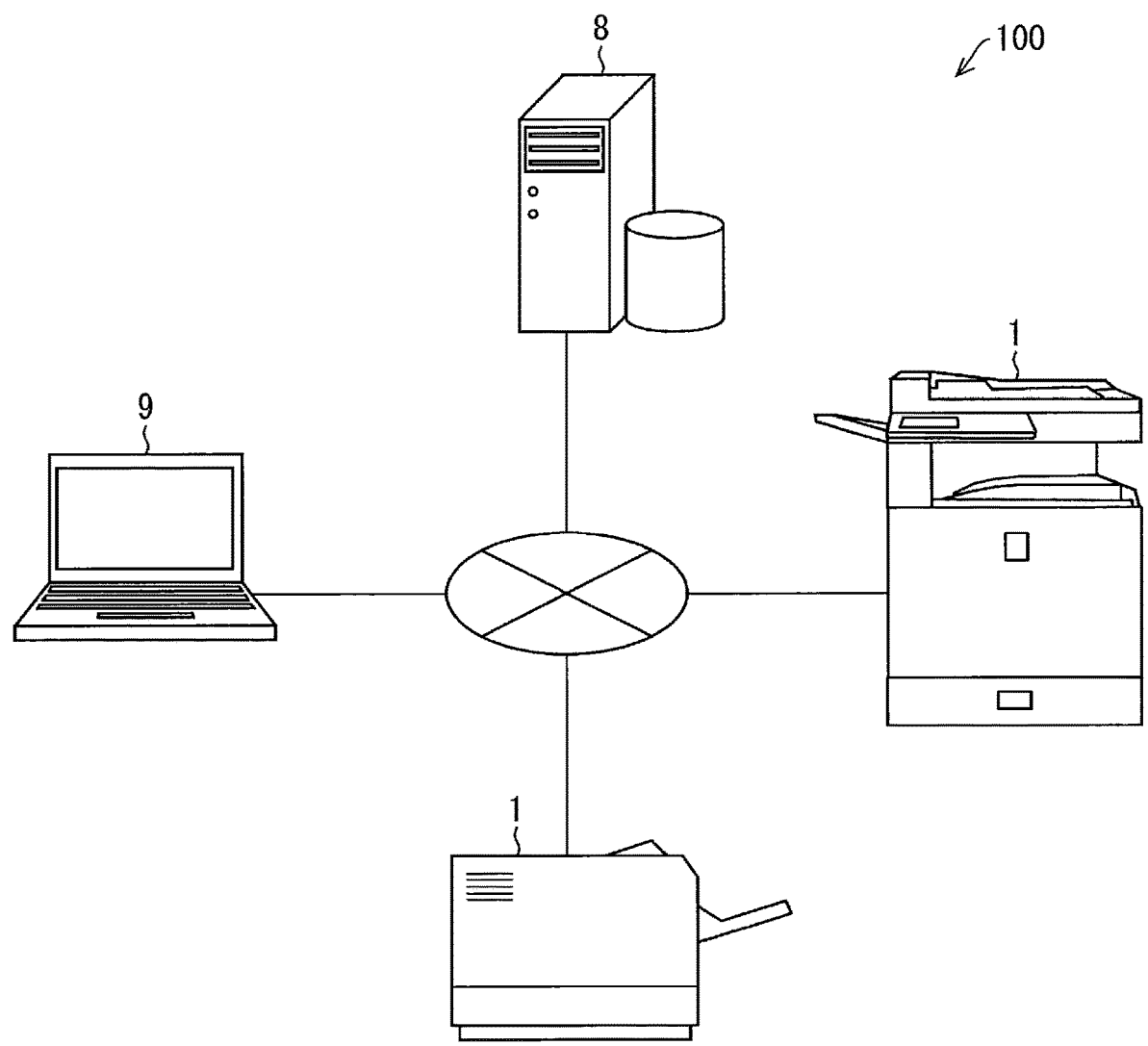
FIG. 1 is an explanation diagram illustrating an overview of an image formation system.

FIG. 1 shows an overview of an image formation system 100 according to an embodiment. As shown in FIG. 1, the image formation system 100 includes a plurality of image forming apparatuses 1, a server 8, and a user terminal 9. The image forming apparatuses 1 shown in FIG. 1 are purchased by the same user. However, while not shown in the drawing, the image formation system 100 may include other image forming apparatuses purchased by other users.

The image forming apparatus 1 is a device for implementing a service provided when an agreement is concluded for the image forming apparatus 1. The server 8 is an external device that communicates with the image forming apparatus 1 via a network and is an example of a management device for managing the image forming apparatus 1. In the embodiment, the server 8 is a server managed by a company.

The term "agreement" in the embodiment denotes an agreement concluded between a user and a company in which the company provides a specific service to the user through a specified image forming apparatus 1. In other words, the user concludes an agreement for a certain image forming apparatus 1. The image forming apparatus 1 may also be considered the subject of the agreement. Hereinafter, the image forming apparatus 1 specified by the user as the subject of the agreement will be called the "contracted machine."

With the agreement established between the user and the company, each image forming apparatus 1 can use special consumables for subscription. As an example of the agreement, the company providing the subscription service and the user agree on a usage period, a usage fee, a maximum number of pages, and the like of the service, and both parties agree that the company will provide this service to the user. In other words, once the agreement for the service is concluded, the image forming apparatus 1 according to the embodiment can execute subscription printing, which is printing under the details of the agreement.

The user can register or change the image forming apparatus 1 serving as the contracted machine at any time. Here, the term "register" may indicate registering a new image forming apparatus or re-registering a previously registered image forming apparatus 1 whose agreement is cancelled. The user can also register a plurality of image forming apparatuses 1 as contracted machines. In other words, the user can use a plurality of image forming apparatuses 1 simultaneously as contracted machines and can change the image forming apparatus 1 being used as the contracted machine from one image forming apparatus 1 to another image forming apparatus 1.

The user terminal 9 used by the user is a device that communicates with the server 8 in order to conclude and cancel the agreement and perform other procedures. An information processing terminal equipped with standard communication functions, such as a personal computer (PC) or a smartphone, may be employed as the user terminal 9. The devices configuring the image formation system 100 can communicate with each other over a communication network such as the Internet.

Overall Structure of the Image Forming Apparatus 1

Figure 2:
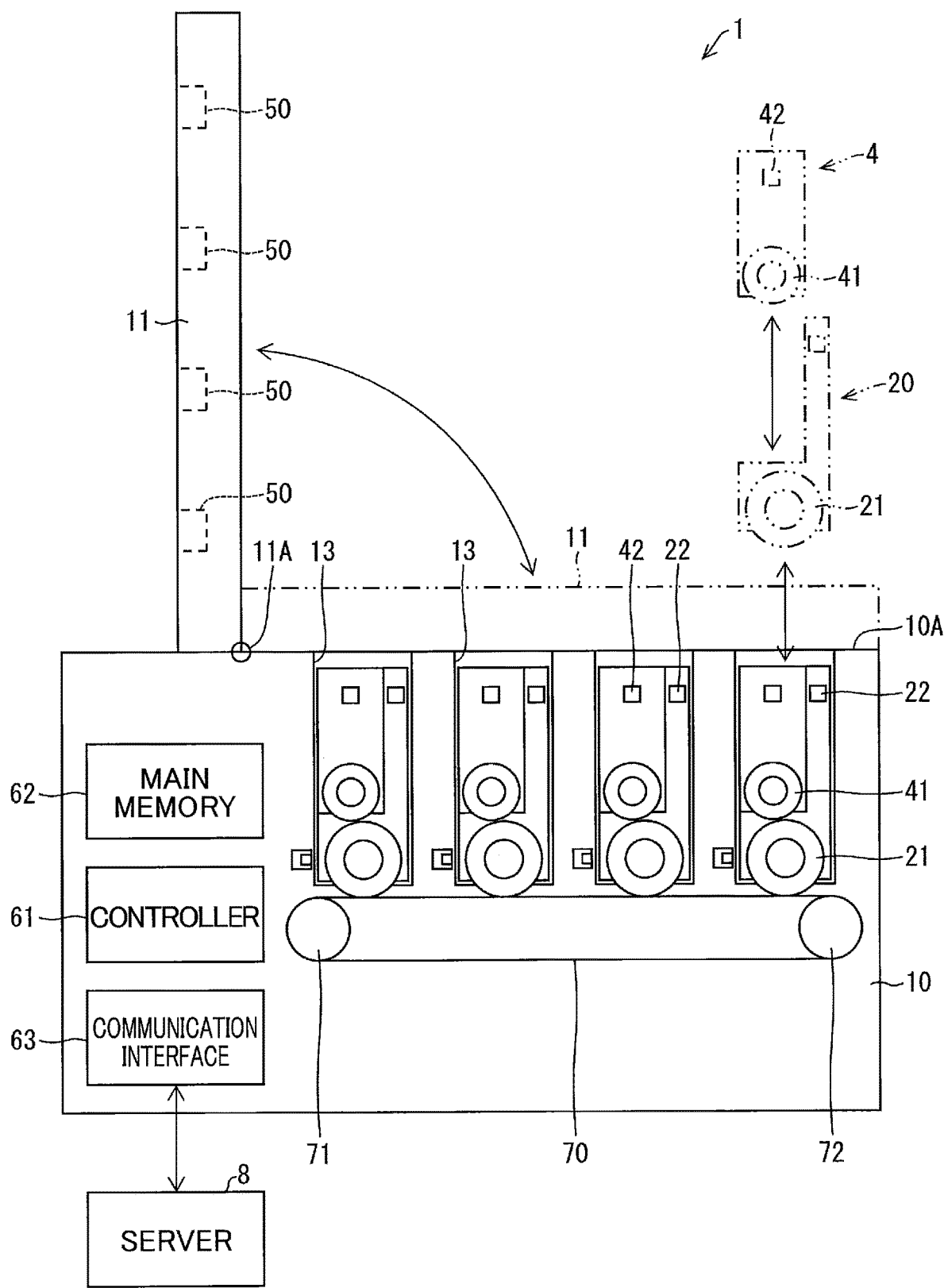
FIG. 2 is an explanation diagram illustrating an overview for a structure of an image forming apparatus.
Figure 3:
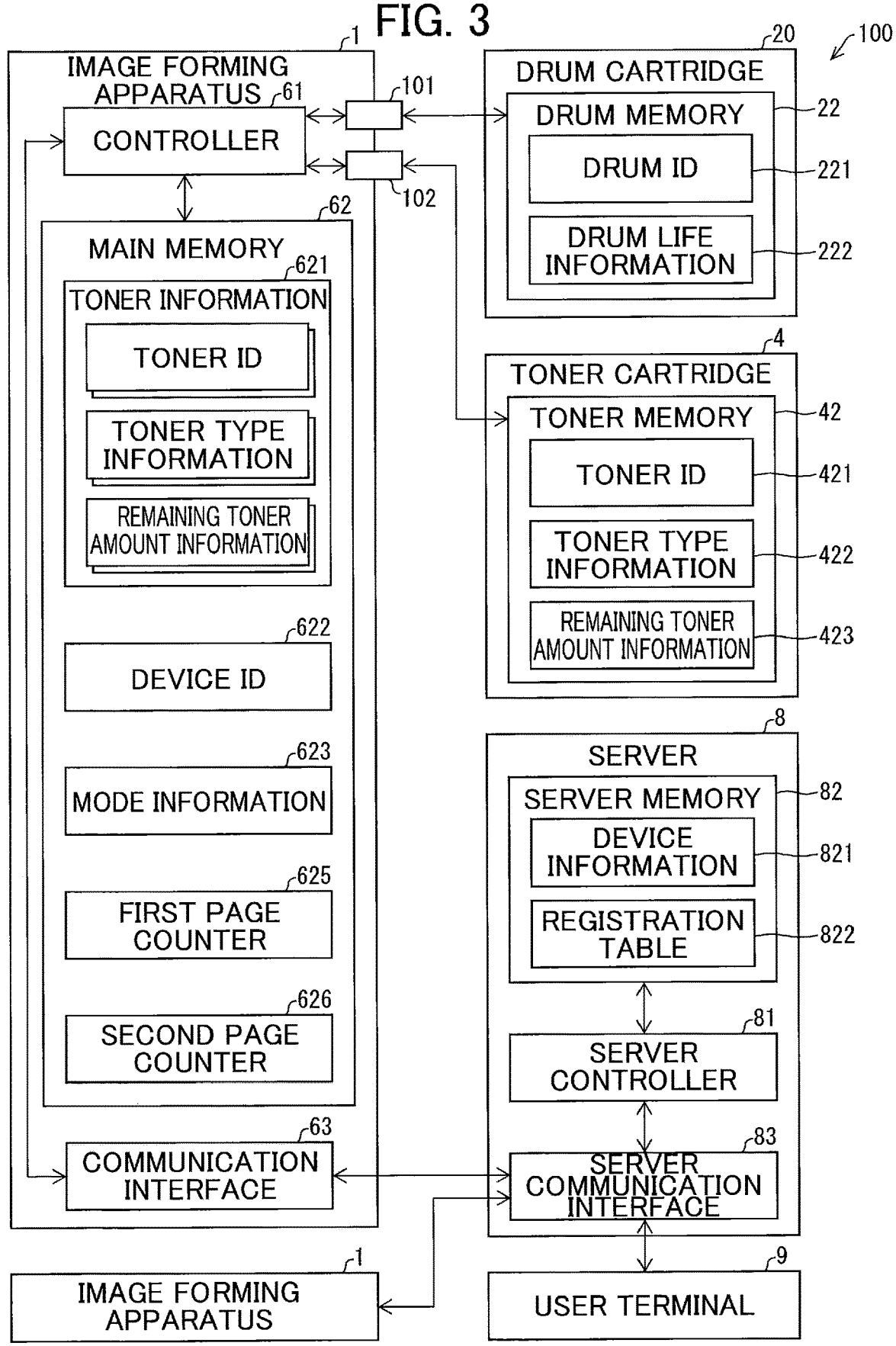
FIG. 3 is a block diagram illustrating internal structures of the image forming apparatus including a drum cartridge and a toner cartridge, and a server, and illustrating relationship between the image forming apparatus and the server.

FIG. 2 is a schematic diagram of the image forming apparatus 1. FIG. 3 shows the internal structures of an image forming apparatus 1, which includes a drum cartridge 20 and a toner cartridge 4, and the server 8; and the connected relationships of the image forming apparatuses 1 and the server 8. While FIG. 3 includes two image forming apparatuses 1, both image forming apparatuses 1 have the same structure.

As shown in FIG. 2, the image forming apparatus 1 is configured of a main casing 10, and a cover 11. While not shown in the drawings, the image forming apparatus 1 may also be provided with a display portion that includes a liquid crystal display, lamps, and the like; and an input interface that includes buttons and the like. The liquid crystal display may also be integrally configured with a touchscreen and may be configured to function as an input interface.

Main Casing 10

Toner cartridges 4 are mounted in the main casing 10 of the image forming apparatus 1. As will be described later in detail, each toner cartridge 4 is mounted in and integrated with a corresponding drum cartridge 20. That is, while mounted in the drum cartridge 20, the toner cartridge 4 is mounted together with the drum cartridge 20 into the main casing 10, thereby achieving the image forming apparatus 1 that includes the drum cartridges 20 and the toner cartridges 4.

Note that four toner cartridges 4 must be mounted in the image forming apparatus 1 according to the embodiment in order to perform printing. In other words, the image forming apparatus 1 according to the embodiment is configured to allow the mounting of four drum cartridges 20 and four toner cartridges 4. However, the numbers of drum cartridges 20 and toner cartridges 4 mounted in the image forming apparatus 1 are not limited to the example of FIG. 2. For example, the image forming apparatus 1 may be a monochrome printer that allows the mounting of a single drum cartridge 20 and a single toner cartridge 4.

The toner cartridges 4 include toner that is consumed when the image forming apparatus 1 executes printing. That is, the toner cartridges 4 are consumables for the image forming apparatus 1. Further, each drum cartridge 20 includes a photosensitive drum 21 that is used for printing executed in the image forming apparatus 1. The drum cartridges 20 are also an example of consumables for the image forming apparatus 1.

The main casing 10 has a rectangular box shape, for example. The four drum cartridges 20, the four toner cartridges 4, a transfer belt 70, a controller 61, a main memory 62, and a communication interface 63 are accommodated in the main casing 10. The main casing 10 has four cartridge retaining portions 13. The cartridge retaining portions 13 are formed as recesses and have openings in the main casing 10. The drum cartridges 20 and the toner cartridges 4 are retained in corresponding cartridge retaining portions 13 when mounted in the main casing 10.

Cover 11

The cover 11 of the image forming apparatus 1 is provided with a light source unit 50 for each of the drum cartridges 20. That is, the image forming apparatus 1 is provided with four light source units 50. The cover 11 can rotate (move) about a rotational shaft 11A extending in a first direction between an open position depicted with solid lines in FIG. 2 for exposing an opening 10A, and a closed position for covering the opening 10A. The opening 10A formed in the top of the main casing 10 is opened and closed by the rotation of the cover 11.

Note that the "first direction" denotes a direction extending in the rotational center of a developing roller (the developing roller axis) in a toner cartridge. The openings of the cartridge retaining portions 13 are exposed when the cover 11 is in the open position and are covered by the cover 11 when the cover 11 is in the closed position.

A cover sensor not shown in the drawings is provided in the opening 10A. The cover sensor detects that the cover 11 is in the closed position. The cover sensor may be a contact-type sensor or an optical sensor, for example.

Toner Cartridges 4

Each toner cartridge 4 has a developing roller 41, and a cartridge casing that can accommodate developer (e.g., toner) as an example of the printing material. The cartridge casing is mountable in the main casing 10. The four toner cartridges 4 accommodate developer in mutually different colors (for example, the colors cyan, magenta, yellow, and black) as the material used for forming images. The developer is a consumable that becomes depleted during use. The developing roller 41 is a cylindrical member that extends in the first direction and is rotatable about a developing roller shaft extending in the first direction. When the toner cartridge 4 is mounted in the drum cartridge 20, the outer peripheral surface of the photosensitive drum 21 contacts the outer peripheral surface of the developing roller 41.

Each toner cartridge 4 also has a toner memory (the consumable memory) 42 as an example of the first memory. The toner memory 42 is positioned on the outer surface of the toner cartridge 4 on one end in the first direction. The toner memory 42 allows reading and writing of information. For example, the toner memory 42 may be flash read-only memory (flash ROM) or electrically erasable programmable read-only memory (EEPROM; registered trademark).

Each toner memory 42 has a first area 421, a second area 422, and a third area 423 for storing information related to the toner cartridge 4. The toner memory 42 stores a toner ID in the first area 421. The toner memory 42 stores toner type information (the type information) in the second area 422. The toner memory 42 stores remaining toner amount information in the third area 423. Note that the third area may be a rewritable area in which data can be rewritten.

The toner ID is a unique serial number for identifying an individual toner cartridge 4, for example. The toner ID may include information indicating the color of the toner cartridge 4.

The toner type information indicates the type of the toner cartridge 4. There are two types of toner cartridges 4 in the embodiment. The first type is a "special cartridge" (the special consumable) that can be used only on a contracted machine. The second type is a "normal cartridge" (the normal consumable) that can also be used in image forming apparatuses 1 including image forming apparatuses which are not contracted machines. Note that the toner type information may also be included in the toner ID. That is, the toner ID may simultaneously be information for identifying an individual toner cartridge 4 and information indicating the type of the toner cartridge 4.

The remaining toner amount information indicates the remaining amount of toner in the toner cartridge 4. In this example, the remaining amount of toner is a value associated with one of a plurality of levels from full to empty. This value is stored in the third area 423. Each level of remaining amount of toner stored in the toner memory 42 may be a character string such as "full", "empty", and the like; may be a numerical value such as "100%", "0%", and the like; or may be information combining a character string and numerical value based on the value described above.

Drum Cartridges 20

Each drum cartridge 20 has a cartridge casing that is mountable in the main casing 10. The cartridge casing includes a photosensitive drum 21 as a part used in image formation. The photosensitive drum 21 is a replacement part. As the photosensitive drum 21 is used, the surface of the photosensitive drum 21 degrades by wear for example, requiring the photosensitive drum 21 to be replaced. The photosensitive drum 21 is a cylindrical photosensitive member extending in the first direction. The photosensitive drum 21 can rotate about a drum roller shaft extending in the first direction. The outer surface of the photosensitive drum 21 is covered by a photosensitive material.

Each drum cartridge 20 also has a drum memory 22. The drum memory 22 allows the reading and writing of information. The drum memory 22 is flash ROM or EEPROM, for example.

Each drum memory 22 has a first area 221 and a second area 222. The first area 221 and the second area 222 are for storing information related to the photosensitive drum 21 of the drum cartridge 20. The drum memory 22 may store a drum ID in the first area 221 and may store drum life information in the second area 222. The drum ID is a unique serial number for identifying an individual drum cartridge 20. The drum life information indicates the remaining life of the photosensitive drum 21.

Mounting of Cartridges and the Printing Mechanism

As shown in FIG. 2, the drum cartridges 20 and the toner cartridges 4 are mounted in the main casing 10 in a state where the cover 11 is in the open position. In this state, the drum cartridges 20 and the toner cartridges 4 are inserted through the opening 10A into the corresponding cartridge retaining portions 13.

The main casing 10 also has connectors 101 and 102. In a state where the drum cartridge 20 is inserted into the cartridge retaining portion 13, the connector 101 becomes electrically connected with the drum memory 22 of the drum cartridge 20 so that the controller 61 can communicate with the drum memory 22. In a state where the toner cartridge 4 is mounted in the main casing 10, the connector 102 is also electrically connected to the toner memory 42 so that the controller 61 in the main casing 10 can communicate with the toner memory 42 of the toner cartridge 4.

The four light source units 50 are mounted on the inner surface of the cover 11. The light source units 50 are positioned to confront the top surfaces of the photosensitive drums 21 in a state where the drum cartridges 20 are mounted in the main casing 10 and the cover 11 is in the closed position. Each light source unit 50 has a plurality of light sources aligned in the first direction. The light sources can irradiate light onto the outer peripheral surface of the corresponding photosensitive drum 21. The light sources are light-emitting diodes (LEDs), for example.

Each light source unit 50 is electrically connected to the controller 61. The controller 61 controls the light sources of each light source unit 50 to emit light based on inputted image data. The light sources irradiate light toward the outer peripheral surfaces of the photosensitive drums 21. As a result, the photosensitive material on the outer peripheral surfaces of the photosensitive drums 21 is exposed according to the image data.

The transfer belt 70 is a part that transfers developer (e.g., toner) present on the surface of a photosensitive drum onto printing paper. The transfer belt 70 is a replacement part. As the transfer belt 70 is used, the surface of the transfer belt 70 degrades by wear for example, requiring the transfer belt 70 to be replaced. The transfer belt 70 is a belt having an annular shape (an endless belt) that can contact each of the photosensitive drums 21. The outer peripheral surfaces of the photosensitive drums 21 can contact the outer peripheral surface of the transfer belt 70. During a printing process, a printing paper is conveyed between the transfer belt 70 and the photosensitive drums 21.

The transfer belt 70 is stretched around a drive roller 71 and a follow roller 72. The drive roller 71 drives the transfer belt 70. The controller 61 rotates the drive roller 71. The follow roller 72 rotates along with the movement of the transfer belt 70 associated with the drive of the drive roller 71.

Internal Structure of the Main Casing

The controller 61 has an application-specific integrated circuit (ASIC), for example. The controller 61 is electrically connected to the main memory 62 and the communication interface 63 provided in the main casing 10. The controller 61 executes various processes for controlling the image forming apparatus 1 to perform a printing process and its related processes.

The controller 61 may also be provided with a processor, such as a CPU. In this case, a control program for implementing a print control method may be stored in the main memory 62. The printing process may be executed in the image forming apparatus 1 by the processor of the controller 61 performing operations according to the control program stored in the main memory 62.

The controller 61 itself may also be provided with a computer-readable storage medium that stores the control program. The storage medium may be a "non-transitory, tangible medium," such as read-only memory (ROM), a tape, a disc, a card, a semiconductor memory, or a programmable logic circuit. Random-access memory (RAM) or the like may also be used for developing the control program.

The control program may also be supplied to the computer via any transmission medium (a communication network, broadcast waves, etc.) capable of transmitting the control program. Note that one aspect of this disclosure is that the control program can be implemented in the form of data signals embedded in a carrier wave, as embodied in electronic transmission.

When the drum cartridge 20 and the toner cartridge 4 are mounted in the corresponding cartridge retaining portion 13 of the main casing 10, the drum memory 22 and the toner memory 42 are electrically connected to the controller 61, as illustrated in FIG. 3. The controller can execute a read process for reading information from the connected drum memory 22 and toner memory 42, and a write process and/or rewrite process for writing or rewriting information to the drum memory 22 and toner memory 42.

The main memory 62 allows the reading and writing of information. The main memory 62 is flash ROM or EEPROM (registered trademark), for example. The main memory 62 has a storage area 621 that stores toner information, a storage area 622 that stores a device ID, a storage area 623 that stores mode information, a storage area 625 that stores a first page counter, and a storage area 626 that stores a second page counter.

The toner information is information related to individual toner cartridges 4 mounted in the image forming apparatus 1. For example, the toner information may be data associating a toner ID read from a certain toner memory 42 with toner type information and remaining toner amount information read from the same toner memory 42. The main memory 62 may store this associated data in the storage area 621 for each toner cartridge 4.

The device ID is identification information for identifying the image forming apparatus 1. The device ID may be the serial number of the image forming apparatus 1, for example.

The mode information indicates the operating mode of the image forming apparatus 1. In the embodiment, the mode information indicates one of two types of modes: a "subscription mode" denoting that the image forming apparatus 1 is registered as a contracted machine, and a "normal mode" denoting that the image forming apparatus 1 is not registered as a contracted machine or that the agreement for the image forming apparatus 1 is cancelled. When the image forming apparatus 1 is shipped, the storage area 623 stores a value corresponding to the normal mode as a default value. The controller 61 rewrites the mode information as needed.

A first page counter may be stored in the storage area 625. The first page counter indicates the cumulative number of pages printed in the image forming apparatus 1. A second page counter may be stored in the storage area 626. The second page counter indicates the number of pages of printed matter that were printed in the image forming apparatus 1 as subscription printing. The count of the second page counter may be reset to 0 each time the image forming apparatus 1 transitions from the subscription mode to the normal mode or may be the cumulative number of pages of printed matter that were printed to date in the image forming apparatus 1 under the agreement. Unless otherwise specified, the value of the second page counter hereafter will be the cumulative number of pages printed by subscription printing.

The communication interface 63 is a communication interface that conducts communications between the image forming apparatus 1 and the server 8. The communication interface 63 outputs various data, notifications, and requests received from the server 8 to the controller 61. The communication interface 63 transmits various data, notifications, and requests inputted from the controller 61 to the server 8.

User Terminal 9

The user terminal 9 has an input interface for receiving various input operations performed by the user, and a communication interface for communicating with the server 8. The user registers a contracted machine in the server 8 through input operations performed on the user terminal 9. For example, the user inputs the user's own identification information and identification information for the image forming apparatus 1 that the user wishes to be a contracted machine into the user terminal 9. When receiving this input, the user terminal 9 transmits the inputted information to the server 8.

In addition to input operations for registering the contracted machine (i.e., for adding a contracted machine), the user terminal 9 may receiving input operations for changing the contracted machine. For example, the user terminal 9 may receive input operations performed by the user to input the user's own identification information, identification information for the contracted machine after the contract change, and identification information for the contracted machine before the contract change. Subsequently, the user terminal 9 may transmit these three pieces of information to the server 8.

Server 8

The server 8 is a management device that manages the operating status of the image forming apparatus 1. The server 8 is provided with a server communication interface 83, a server memory 82, and a server controller 81. The server controller 81 is a central processing unit (CPU) that performs overall control of the server 8. The server memory 82 is a storage device that stores data required for operations on the server 8.

The server controller 81 updates a registration table stored in the server memory 82 based on notifications or requests received from the image forming apparatuses 1. The "registration table" is a data table registering image forming apparatuses 1 that users designated as contracted machines. The "registration table" is also data for each contracted machine indicating one of that the subscription for the contracted machine is currently valid or that the subscription for the contracted machine is not currently valid. A specific configuration of the registration table will be described later.

The server memory 82 has a storage area 821 and a storage area 822. The server memory 82 stores device information in the storage area 821 and stores the registration table in the storage area 822. The storage area 822 is rewritable.

The device information is data compiling various information related to the image forming apparatus 1. The device information is stored separately for each image forming apparatus 1. The device information includes at least a device ID. In addition, the device information may include the value of the first page counter and/or the value of the second page counter.

The server communication interface 83 is a communication interface for conducting communications between the server 8 and the image forming apparatuses 1. The server communication interface 83 outputs various data, notifications, and requests received from image forming apparatuses 1 to the server controller 81. The server communication interface 83 transmits various data, notifications, and requests inputted from the server controller 81 to the image forming apparatuses 1.

For example, the server communication interface 83 may receive a device ID and the value of the first page counter and/or the value of the second page counter from the image forming apparatus 1 and output these values to the server controller 81. The server controller 81 may also store an inputted device ID and the value of the first page counter and/or the value of the second page counter in association with each other in the server memory 82 as device information for the image forming apparatus 1.

Registration Table

FIG. 4 shows an example of the data structure for a registration table. The registration table stores data associating the following information items (1)-(4) as one record. Note that information item (4) may be omitted.

(1) User identification information (2) Identification information for the image forming apparatus 1 registered as a contracted machine by the user indicated in (1)

(3) Status of the subscription for the image forming apparatus 1 indicated by the identification information in (2)

(4) Identification information for the image forming apparatus 1 whose subscription is to be changed to the image forming apparatus 1 indicated by the identification information in (2) (i.e., the contracted machine before the contract change)

In the example of FIG. 4, information indicating a username is stored as the (1) under the column "Username". Also in the example of FIG. 4, a device ID for the image forming apparatus 1 is stored as the (2) under the column "Device ID". Also in the example of FIG. 4, information indicating one of the three types "pre-start," "valid," or "invalid" is included as the (3) under the column "Subscription". Note that information under the column "Subscription" is given as character strings for convenience, but the information in this column may be numerical values. Also in the example of FIG. 4, the device ID of the image forming apparatus 1 before the contract change is stored as (4) under the column "Pre-change."

Flow of a Subscription Process

1: Subscription Process when No Device Before the Contract Change is Set

Figure 5:
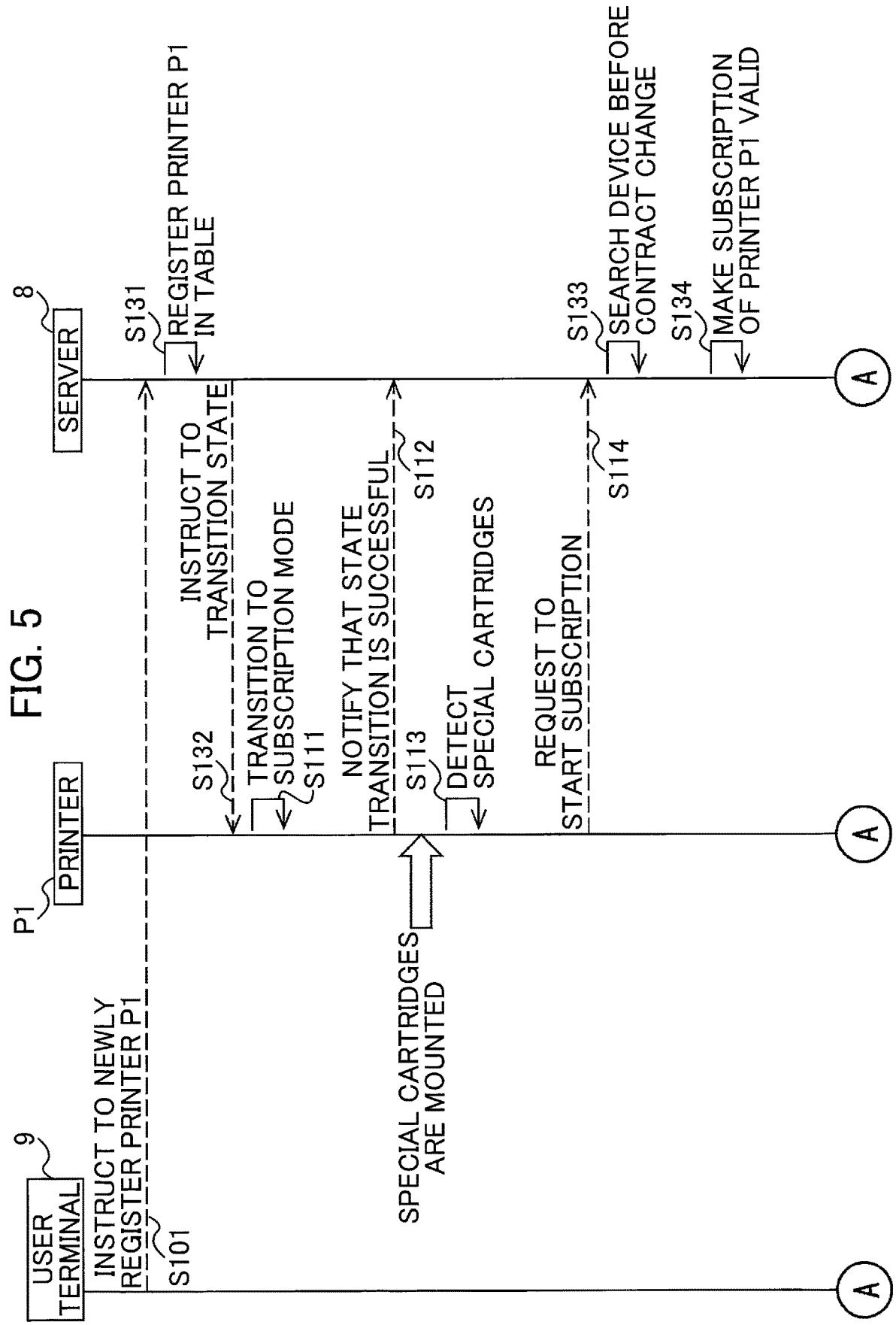
FIG. 5 is a sequential diagram illustrating an example of operations for each device in the image formation system.

FIG. 5 is a sequence chart showing an example of operations in various devices in the image formation system 100. In FIG. 5, first an example of operations will be described for the case in which a printer P1 as an example of the image forming apparatus 1 is being newly registered as a contracted machine by a user A and in which an image forming apparatus 1 before the contract change is not set for the printer P1. The device ID of the printer P1 is "00000001".

The user of the printer P1 performs input operations on the user terminal 9 in order to register the printer P1 as the new contracted machine. In response to receiving the input operations, in S101, the user terminal 9 issues an instruction to the server 8 to newly register the printer P1. This instruction for a new registration includes the username inputted by the user, and the device ID of the printer P1 that was inputted by the user or that the user terminal 9 acquired from the printer P1.

The server controller 81 of the server 8 receives the new registration instruction via the server communication interface 83. In response to receiving the new registration instruction, in S131, the server controller 81 registers the printer P1 in the registration table stored in the server memory 82. Specifically, the server controller 81 performs the following operations (1)-(4) on the registration table.

(1) Add one record.

(2) Store the username included in the new registration instruction in the added record under the column "Username."

(3) Store the device ID of the printer P1 in the added record under the column "Device ID."

(4) Store information indicating "pre-start" in the added record under the column "Subscription."

FIG. 7 shows changes to information in records of the registration table according to processes shown in FIG. 5 and FIG. 6 (described later). After completing the process in S131 described above, a new record is added in the top line of the registration table, as shown in FIG. 7. For readability, records are sorted by username in FIG. 7, but there is no particular restriction on the position at which a record is added.

Returning again to the description in FIG. 5, after registering the printer P1 in the registration table, in S132, the server controller 81 issues a state transition instruction to the printer P1 via the server communication interface 83 to transition to the subscription mode. The controller 61 of the printer P1 receives the state transition instruction via the communication interface 63. In response to receiving this state transition instruction, in S111, the controller 61 transitions the state of the printer P1 to the subscription mode. In other words, the controller 61 rewrites the mode information from the "normal mode" in the main memory 62 to the "subscription mode." Through the process described above, the printer P1 transitions to a state for operating as a contracted machine.

After the printer P1 is transitioned to the subscription mode, in S112, the controller 61 notifies the server 8 via the communication interface 63 that the state transition is successful. The server controller 81 of the server 8 receives the notification from the printer P1 via the server communication interface 83. In a case where the server controller 81 receives the notification of a successful state transition, the server controller 81 may arrange to ship special cartridges to the address for the user of the printer P1 (i.e., user A).

Thereafter, in S113, the controller 61 of the printer P1 determines at a prescribed timing whether special cartridges are mounted in the main casing 10 of the image forming apparatus 1. In a case where the controller 61 determines that special cartridges are mounted, in S114, the controller 61 transmits to the server 8 a request to start the subscription. The subscription start request includes the device ID of the printer P1. An image forming apparatus 1 before the contract change is not set in the example of FIG. 5. However, in a case where an image forming apparatus 1 before the contract change (another image forming apparatus 1) is set, this subscription start request would also trigger the cancellation of the subscription for the other image forming apparatus 1 as the subject.

The server controller 81 receives the subscription start request from the printer P1 via the server communication interface 83. In S133, the server controller 81 searches records in the registration table using the device ID of the printer P1 as a key to identify whether an image forming apparatus 1 before the contract change is set for the printer P1 in the registration table.

As described above, an image forming apparatus 1 before the contract change is not set for the printer P1. In S134, the server controller 81 rewrites the record for the printer P1 in the registration table under the column "Subscription" to information indicating "valid," as illustrated in the second table of FIG. 7. By rewriting the record, the server controller 81 can make the subscription for the printer P1 valid on the server 8.

2: Subscription Process when a Device Before the Contract Change is Set

Next, an example of operations will be described for a case in which the user is registering one image forming apparatus 1 as the contracted machine while a different image forming apparatus 1 is set as the device before the contract change.

Figure 6:
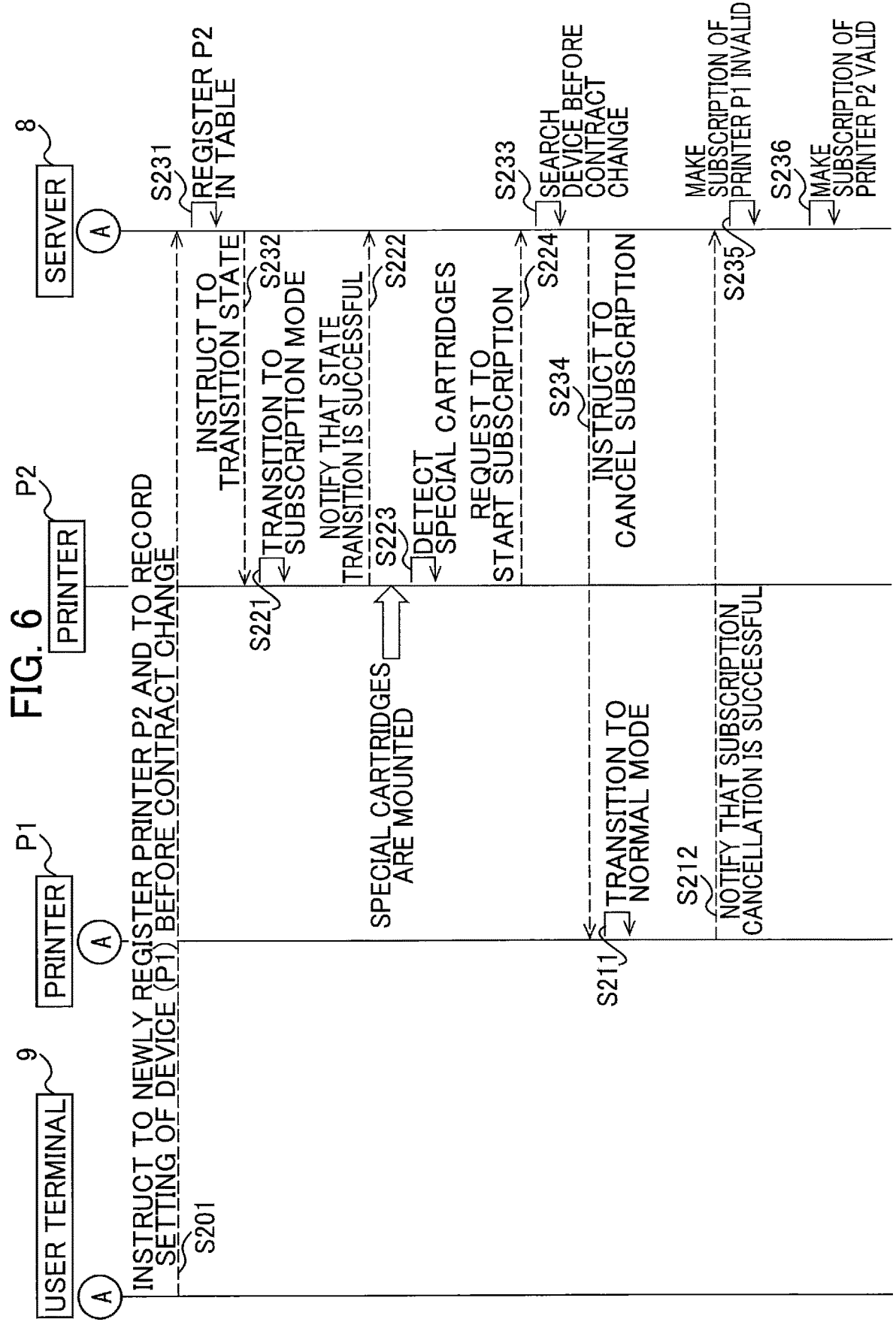
FIG. 6 is a sequential diagram illustrating another example of operations for each device in the image formation system.

FIG. 6 is a sequence chart showing another example of operations on various devices in the image formation system 100. FIG. 6 shows an example of operations performed after the series of processes in FIG. 5 is completed. Hence, the user terminal 9, the printer P1, and the server 8 in FIG. 6 completed the series of processes shown in FIG. 5.

The example in FIG. 6 shows operations performed when a printer P2 as an example of the image forming apparatus 1 is being newly registered by the user A as the contracted machine and the printer P1 is set as the device before the contract change to the printer P2. The device ID of the printer P2 is "00000002".

The user performs input operations on the user terminal 9 in order to register the printer P2 as the new contracted machine. At this time, the printer P1 is also set as the device before the contract change. In response to receiving the input operations, in S201, the user terminal 9 issues an instruction to the server 8 to newly record the printer P2 and to record a setting of the printer P1 as the device before the contract change. The instruction for this new registration includes the username, device ID of the printer P2, and device ID of the printer P1. The instruction also includes information indicating that the printer P1 is the device before the contract change.

The server controller 81 of the server 8 receives the new registration instruction via the server communication interface 83. In response to receiving the new registration instruction, in S231, the server controller 81 registers the printer P2 in the registration table stored in the server memory 82. Specifically, the server controller 81 performs the following operations (1)-(5) on the registration table.

(1) Add one record.
(2) Store the username included in the new registration instruction in the added record under the column "Username."
(3) Store the device ID of the printer P2 in the added record under the column "Device ID."
(4) Store information indicating "pre-start" in the added record under the column "Subscription."
(5) Store the device ID of the printer P1 in the added record under the column "Pre-change."

By storing information in (1)-(5) in the registration table, the printer P2 is recorded in the registration table in association with the device that was contracted prior to contract change to the printer P2, as illustrated in the third table of FIG. 7.

Thereafter, the same process described in S132 and S111-S114 of FIG. 5 is executed between the server 8 and the printer P2. In other words, in S232, the server 8 issues a state transition instruction to the printer P2. Next, in S221, the controller 61 of the printer P2 changes the state of the printer P2 to the subscription mode, and in S222, the controller 61 notifies the server 8 that the state transition is successful. Through this process, the printer P2 transitions to a state for operating as a contracted machine. Further, in a case where the controller 61 of the printer P2 detects the mounting of special cartridges in S223, in S224, the controller 61 transmits to the server 8 a request to start the subscription. As will be described later in greater detail, this subscription start request serves as a trigger to cancel the subscription for the printer P1 as the subject. Hence, the request transmitted by the controller 61 of the printer P2 to begin the subscription may also be considered a request to cancel the subscription for the printer P1 as the subject.

In response to receiving the subscription start request from the printer P2, in S233, the server controller 81 searches records in the registration table using the device ID of the printer P2 as a key to find a record having the ID of the printer P1 stored under "Device ID." Next, the server controller 81 determines whether a device ID is stored in the found record under the column "Pre-change." As shown in the third table of FIG. 7, the ID for the printer P1 is stored under the column "Pre-change" in the record for the printer P2. In S234, the server controller 81 transmits a subscription cancellation instruction to the image forming apparatus 1 indicated by the device ID stored under the column "Pre-change" (i.e., the printer P1).

In response to receiving the subscription cancellation instruction, in S211, the controller 61 of the printer P1 rewrites the mode information from the "subscription mode" to the "normal mode." By rewriting the mode information, the printer P1 can no longer print under the subscription.

After completing the process of S211, in S212, the controller 61 of the printer P1 transmits to the server 8 a notification indicating that the subscription cancellation is successful. In response to receiving the notification for the successful cancellation, the server controller 81 of the server 8 searches records in the registration table using the device ID of the printer P1 as a key to find the record storing the ID of the printer P1 under "Device ID." In S235, the server controller 81 changes the information in the found record under the column "Subscription" from "valid" to "invalid." The fourth table in FIG. 7 is a table after this change. By rewriting the record, the server controller 81 can make the subscription for the printer P1 invalid in the server controller 81. Through the process described above, the server 8 can cancel the subscription for the printer P1 in response to the subscription start request received from the printer P2.

After executing the process in S235, in S236, the server controller 81 rewrites information in the record of the registration table indicating the printer P2 to change the information in the column "Subscription" to "valid," as indicated in the fifth table of FIG. 7. By rewriting the record in this way, the server controller 81 can make the subscription for the printer P2 as the subject valid on the server 8. The process described above completes the change in subscription from the printer P1 to the printer P2.

State Transitions in the Image Forming Apparatus 1

FIG. 8 is a flowchart showing sample flow in the process related to state transitions in the image forming apparatus 1 among the sample operations in the image formation system 100 described in FIGS. 5 through 7. Note that the image forming apparatus 1 is in the normal mode at the starting point of the flowchart in FIG. 8. In other words, the mode information in the main memory 62 is "normal mode" at the starting point of the flowchart in FIG. 8.

Until the communication interface 63 receives a state transition instruction from the server 8, the controller 61 does not change the status of the image forming apparatus 1 but maintains the image forming apparatus 1 in the normal mode (S11: NO). When the communication interface 63 receives a state transition instruction from the server 8 (S11: YES), in S12 the controller 61 transitions the state of the image forming apparatus 1 from the normal mode to the subscription mode.

When the state of the image forming apparatus 1 is transitioned to the subscription mode, in S13, the controller 61 notifies the server 8 that the state transition is successful. Thereafter, the controller 61 waits (S14: NO) until the controller 61 determines that special cartridges are mounted in the image forming apparatus 1. The controller 61 determines in S14, at a prescribed timing whether the special cartridges are mounted in the main casing 10 of the image forming apparatus 1 (the consumable determination process).

While the prescribed timing for executing the process of S14 is not particularly limited, the process may be triggered by the power to the image forming apparatus 1 being turned on or the cover sensor detecting that the opening is closed by the cover 11.

Further, the controller 61 may perform the determination of S14 each time the triggering operations described above are detected, irrespective of the state of the image forming apparatus 1. In this case, the controller 61 may execute a storage process during the determination of S14 to read toner type information from each of the toner cartridges 4 and store the information in the main memory 62. Further, in a case where the determination of S14 is performed, the controller 61 only executes a process of S15 described later in a case where the toner type information is not stored in the main memory 62 or all toner type information stored in the main memory 62 indicates normal cartridges, and it was determined in S113 that one or more toner cartridges 4 mounted in the main casing 10 are special cartridges.

In a case where the controller 61 determines that special cartridges are mounted in the image forming apparatus 1 (S14: YES), in S15, the controller 61 transmits a request to start the subscription to the server 8 at a prescribed timing (the transmission process).

There is no particular restriction on the timing at which the transmission process of S15 is executed. For example, the controller 61 may execute the transmission process of S15 in response to a communication request from the server 8 after the controller 61 executed the consumable determination process of S14. Alternatively, in a case where the controller 61 communicates periodically with the server 8, for example, the controller 61 may execute the transmission process of S15 when the timing for the next periodic communication arrives after the controller 61 executed the consumable determination process of S14.

After the controller 61 executes the transmission process of S15, the image forming apparatus 1 operates as the contracted machine. Thereafter, until subscription cancellation instruction will be received from the server 8, the image forming apparatus 1 can execute printing processes under the subscription as the contracted machine (S16: NO). However, in a case where the controller 61 receives a subscription cancellation instruction from the server 8 (S16: YES), in S17, the controller 61 transitions the state of the image forming apparatus 1 to the normal mode. Through this state transition, the subscription for the image forming apparatus 1 as the subject is cancelled and the image forming apparatus 1 operates as a device that performs printing processes using normal cartridges.

Process in the Server 8

FIG. 9 is a flowchart showing sample flow in the process performed by the server 8 in relation to starting and cancelling the subscription among the sample operations in the image formation system 100 described in FIGS. 5-7. It will be assumed that the subscription for a first device serving as an example of the image forming apparatus 1 is newly registered in the registration table of the server memory 82 before starting the process in FIG. 8.

The server controller 81 waits (S21: NO) until a subscription start request is received from an image forming apparatus 1. When the server controller 81 receives the subscription start request from the first device (S21: YES), the server controller 81 searches records in the registration table using the device ID of the first device as a key to determine whether a device before the contract change (an image forming apparatus 1 before the contract change) is set in the registration table for the first device. Note that the device ID for the first device is included in the subscription start request.

In a case where a device before the contract change is not set for the first device (S22: NO), in S26, the server controller 81 changes the information in the record for the first device of the registration table under the column "Subscription" from "pre-start" to "valid." By rewriting the record, the server controller 81 can make the subscription for the first device valid. Next, the server controller 81 waits (S21: NO) until a subscription start request is received again from any image forming apparatus 1.

On the other hand, in a case where a device before the contract change is set for the first device (S22: YES), the server controller 81 executes a process for cancelling the subscription for the device before the contract change prior to performing the process of S26.

Specifically, in S23, the server controller 81 transmits the subscription cancellation instruction to the device before the contract change. In a case where the server controller 81 subsequently receives a notification indicating that the subscription cancellation is successful (S24: YES), in S25, the server controller 81 changes the information under the column "Subscription" in the record of the registration table for the device before the contract change to "invalid." In S26, the server controller 81 makes the subscription for the first device on the server 8 valid.

In a case where the notification indicating that the subscription cancellation is successful is not received from the device before the contract change (S24: NO), the server controller 81 waits in S21 until a subscription start request is again received from the first device. Here, the server controller 81 may make a NO determination in S24 when the notification indicating that the subscription cancellation is successful is not received from the device before the contract change within a fixed time period. Further, when NO determination is made in S24, the server controller 81 may wait after first notifying the first device of the failure to cancel the subscription.

Variations

First Variation: Variations in the Cartridge

The drum cartridge 20 and the toner cartridge 4 may be integrally configured as an integrated cartridge. The integrated cartridge includes a cartridge casing, a photosensitive drum, a memory, and a developing roller. The outer peripheral surface of the developing roller contacts the outer peripheral surface of the photosensitive drum inside the integrated cartridge. The cartridge casing of the integrated cartridge accommodates toner. The memory in the integrated cartridge stores the various information stored in the drum memory 22 and the toner memory 42.

Further, the present disclosure is not limited to the form described above in which the drum cartridge 20 includes the photosensitive drum 21 and the toner cartridge 4 has the developing roller 41. For example, the drum cartridge 20 may include the developing roller 41 in addition to the cartridge casing, the photosensitive drum 21, and the drum memory 22. In this case, the photosensitive drum 21, the drum memory 22, and the developing roller 41 are provided in the cartridge casing. Further, the toner cartridge 4 may include the cartridge casing and the toner memory 42 but not the developing roller 41, for example. The cartridge casing accommodates toner. The outer peripheral surface of the developing roller 41 contacts the outer peripheral surface of the photosensitive drum 21 inside the drum cartridge 20.

The image forming apparatus 1 may further be provided with a developing cartridge (not shown) that includes a developing roller. In this case, the drum cartridge 20 includes the cartridge casing, the photosensitive drum 21, and the drum memory 22. The toner cartridge 4 includes the cartridge casing and the toner memory 42 but does not include the developing roller 41. The cartridge casing accommodates toner. The three parts, that is, the drum cartridge 20, the toner cartridge 4, and the developing cartridge are retained in the cartridge retaining portions 13 so that these three parts are mounted in the main casing 10.

Alternatively, the image forming apparatus 1 may be provided with a single cartridge (not shown) in place of the drum cartridge 20 and the toner cartridge 4. In this case, the single cartridge includes a cartridge casing, the photosensitive drum 21, the memory, and the developing roller 41. The outer peripheral surface of the developing roller 41 contacts the outer peripheral surface of the photosensitive drum 21 inside the cartridge. The cartridge casing of the cartridge accommodates toner.

Further, the details of the present disclosure may further be applied when the drum cartridge 20 or the transfer belt 70 is treated as the cartridge in place of the toner cartridge 4.

Second Variation: Variations in the Specific Structure of the Image Forming Apparatus 1

The image forming apparatus 1 may be an inkjet printer. In a case where the image forming apparatus 1 is the inkjet printer, ink cartridges are mounted in the cartridge retaining portions 13 of the image forming apparatus 1 instead of the drum cartridges 20 and the toner cartridges 4 described in the embodiments. There is no particular restriction on the number of ink cartridges mounted in the image forming apparatus 1. For example, a total of four ink cartridges corresponding to the four colors cyan, magenta, yellow, and black may be mounted in the image forming apparatus 1, or a single cartridge for the single color black may be mounted in the image forming apparatus 1.

Each ink cartridge has a built-in ink memory. The ink memory stores an ink ID, ink type information, and a remaining ink amount, for example. Here, the remaining ink amount may be omitted. The ink ID is information similar to the toner ID. The ink type information is information similar to the toner type information.

Flow in the processes of FIGS. 1 through 9 are executed similarly to a case where the image forming apparatus 1 is the inkjet printer. Specifically, in a case where the image forming apparatus 1 is the inkjet printer, the terms "toner cartridge 4," "toner memory 42," "toner ID," and "toner type information" in the description of the embodiments may be replaced with the terms ink cartridge, the ink memory, the ink ID, and the ink type information. Thus, the same effects described for the image forming apparatus 1 in the embodiment are obtained in a case where the image forming apparatus 1 is the inkjet printer.

The image forming apparatus 1 may also be a multifunction peripheral (MFP) provided with a combination of other functions, such as a scanner or a facsimile function. The image forming apparatus 1 in this variation obtains the same effects as the image forming apparatus 1 in the embodiment.

Third Variation: Cancelling a Subscription Through the Server 8 for an Image Forming Apparatus 1 Before a Contract Change In the embodiment described above, the controller 61 of the image forming apparatus 1 before the contract change returns the state of the image forming apparatus 1 to the normal mode in a case where the subscription cancellation instruction is received from the server 8. However, the trigger for cancelling the subscription for the image forming apparatus 1 before the contract change on the image formation system 100 of the present disclosure is not limited to this method.

When transmitting a state transition instruction as seen in the example of FIG. 6 (S232), the server controller 81 of the server 8 may include the device ID for the printer P1 in the state transition instruction, where the printer P1 is the image forming apparatus 1 before the subscription is changed to the printer P2. Further, the controller 61 of the printer P2 may be configured to be able to communicate with the printer P1, which is an external device and constitutes the other image forming apparatus 1. When transmitting a subscription start request to the server 8 in S224, the controller 61 of the printer P2 may transmit a subscription cancellation instruction to the printer P1 based on the device ID of the printer P1 acquired from the server 8. In response to receiving the subscription cancellation instruction from the printer P2, the controller 61 of the printer P1 changes the state of the printer P1 to the normal mode (S211), similarly to a case where the instruction is received from the server 8. Through this process of state transitions, the printer P2 can cancel the agreement for the printer P1 directly without going through the server 8.

Implementation Through Software

The control block for the image forming apparatus 1 and the server 8 may be implemented by logic circuits (hardware) formed on an integrated circuit (a chip) or the like or may be implemented through software.

In the latter case, each of the image forming apparatus 1 and the server 8 are provided with a computer to execute instructions in a program, which is software for implementing each function. This computer is provided with one or more processors, and a computer-readable storage medium for storing the program described above, for example. In this computer, the processor reads the program from the storage medium and executes the program to attain the objects of the present disclosure. A central processing unit (CPU) may be used as the processor, for example. The storage medium may be a "non-transitory, tangible medium," such as ROM, a tape, a disc, a card, semiconductor memory, or a programmable logic circuit. Random-access memory (RAM) may also be provided for developing the program. The program may also be supplied to the computer described above via any transmission medium (a communication network, broadcast waves, etc.) capable of transmitting the program. Note that one aspect of this specification is that the program can be implemented in the form of data signals embedded in a carrier wave, as embodied in electronic transmission.

While the disclosure has been described in detail with reference to the specific embodiment thereof, it would be apparent to those skilled in the art that various changes and modifications may be made therein without departing from the scope of the disclosure.

What is claimed is:

1. An image forming apparatus comprising:
a main casing;
a consumable configured to be mounted in the main casing;
a communication interface; and
a controller,
wherein the consumable includes a consumable memory, the consumable memory storing type information indicating one of that the consumable is a special consumable that can be used in a case where an agreement is entered for the image forming apparatus as a contract subject and that the consumable is a normal consumable that can be used irrespective of whether the agreement is entered,
wherein the controller is configured to perform:
a consumable determination process to determine based on the type information stored in the consumable memory whether the consumable mounted in the main casing is the special consumable; and
a transmission process in a case where the consumable determination process determines that the consumable mounted in the main casing is the special consumable, the transmission process being to transmit via the communication interface a request to an external device which communicates with the image forming apparatus, the request being to cancel an agreement which is entered for another image forming apparatus as a contract subject, the another image forming apparatus being different from the image forming apparatus.

2. The image forming apparatus according to claim 1, wherein the external device is a management apparatus to manage the image forming apparatus,
wherein the management apparatus stores identification information of the image forming apparatus and identification information of the another image forming apparatus associated with each other in advance,
wherein the controller is configured to perform:
causing the management apparatus to cancel the agreement entered for the another image forming apparatus as the contract subject by requesting the management apparatus to start the agreement for the image forming apparatus as the contract subject in the transmission process.

3. The image forming apparatus according to claim 1, further comprising a cover movable between an open position at which an opening, which the main casing has, is opened and a closed position at which the opening is closed,
wherein the controller performs the consumable determination process triggered by power to the image forming apparatus being turned on or the cover closing the opening.

4. The image forming apparatus according to claim 1, further comprising a main memory configured to store type information for a plurality of consumables which is mounted in the main body,
wherein the controller is configured to perform:
a storing process when performing the consumable determination process, the storing process being to read type information from each of the plurality of consumables, and store the read type information in the main memory,
wherein the controller performs the transmission process in a case where the main memory does not store any type information or all the type information stored in the main memory indicates the normal consumables, and the consumable determination process determines that one or more consumables mounted in the main casing is the special consumables.

5. The image forming apparatus according to claim 1, wherein the controller performs the transmission process in response to a communication request from the external device after the consumable determination process is performed.

6. The image forming apparatus according to claim 1, periodically performing communication with the external device,
wherein the controller performs the transmission process when timing of the periodically-performed communication arrives after the consumable determination process is performed.

7. The image forming apparatus according to claim 1, wherein the consumable is a toner cartridge or an ink cartridge.

8. A method for controlling an image forming apparatus,
wherein a consumable memory, which is provided in a consumable mounted in a main casing of the image forming apparatus, stores type information indicating one of that the consumable is a special consumable that can be used in a case where an agreement is entered for the image forming apparatus as a contract subject and that the consumable is a normal consumable that can be used irrespective of whether the agreement is entered,
the method comprising:

a consumable determination step to determine based on the type information stored in the consumable memory whether the consumable mounted in the main casing is the special consumable; and a transmission step in a case where the consumable determination step determines that the consumable mounted in the main casing is the special consumable, the transmission step being to transmit via a communication interface in the image forming apparatus a request to an external device which communicates with the image forming apparatus, the request being to cancel an agreement which is entered for another image forming apparatus as a contract subject, the another image forming apparatus being different from the image forming apparatus.

* * * * *

UNITED STATES PATENT AND TRADEMARK OFFICE
CERTIFICATE OF CORRECTION

PATENT NO. : 11,619,901 B2
APPLICATION NO. : 17/525455
DATED : April 4, 2023
INVENTOR(S) : Kaigawa It is certified that error appears in the above-identified patent and that said Letters Patent is hereby corrected as shown below:

On the Title Page

(57) ABSTRACT should read:
In an image forming apparatus, a consumable is mounted in the main casing. The consumable includes a consumable memory. A controller performs a consumable determination process to determine based on type information stored in the consumable memory whether the consumable mounted in the main casing is a special consumable. The controller performs a transmission process in a case where the consumable determination process determines that the consumable mounted in the main casing is the special consumable. The transmission process transmits via the communication interface a request to an external device which communicates with the image forming apparatus. The request is to cancel an agreement which is concluded for another image forming apparatus as a contract subject. The another image forming apparatus is different from the image forming apparatus.

In the Claims

Claim 4, Column 18, Line 42: Delete "is the special consumables" and insert -- are the special consumables -- therefor.

Signed and Sealed this
Fourteenth Day of November, 2023

Katherine Kelly Vidal
*Director of the United States Patent and Trademark Office*